US006888445B2

(12) United States Patent
Gotfried et al.

(10) Patent No.: US 6,888,445 B2
(45) Date of Patent: May 3, 2005

(54) VEHICLE IDENTIFICATION SYSTEM

(76) Inventors: Bradley L. Gotfried, 8949 SE. Bridge Rd., Hobe Sound, FL (US) 33455; Benjamin Gotfried, 8949 SE. Bridge Rd., Hobe Sound, FL (US) 33455

(*) Notice: Subject to any disclaimer, the term of this patent is extended or adjusted under 35 U.S.C. 154(b) by 168 days.

(21) Appl. No.: 10/441,452

(22) Filed: May 20, 2003

(65) Prior Publication Data

US 2004/0233046 A1 Nov. 25, 2004

(51) Int. Cl.[7] .................. B60Q 1/00; G08B 25/00; G06K 5/00
(52) U.S. Cl. .............. 340/425.5; 340/525; 340/5.2; 340/5.32; 340/5.6; 307/10.5; 235/382; 235/384
(58) Field of Search ................. 340/468, 525, 340/425.5, 426.35, 426.36, 438, 439, 5.1, 5.2, 5.3, 5.32, 5.51, 5.52, 5.8, 5.53, 5.6, 5.72, 5.81, 5.82, 5.83, 5.61, 5.33; 307/9.1, 10.1, 10.2, 10.5; 235/375, 382

(56) References Cited

U.S. PATENT DOCUMENTS

| 2,803,810 | A |   | 8/1957  | Evans et al.     |         |
|-----------|---|---|---------|------------------|---------|
| 4,768,027 | A |   | 8/1988  | Benjamin et al.  |         |
| 4,816,658 | A | * | 3/1989  | Khandwala et al. | 235/382 |
| 4,982,072 | A |   | 1/1991  | Takigami         |         |
| 4,993,068 | A |   | 2/1991  | Piosenka et al.  |         |
| 5,124,920 | A |   | 6/1992  | Tamada et al.    |         |
| 5,459,304 | A |   | 10/1995 | Eisenmann        |         |
| 5,469,506 | A |   | 11/1995 | Berson et al.    |         |
| 5,519,260 | A |   | 5/1996  | Washington       |         |
| 5,546,471 | A |   | 8/1996  | Merjanian        |         |
| 5,592,408 | A |   | 1/1997  | Keskin et al.    |         |
| 5,598,474 | A |   | 1/1997  | Johnson          |         |
| 5,661,492 | A |   | 8/1997  | Shoap et al.     |         |
| 5,678,196 | A |   | 10/1997 | Doyle            |         |
| 5,748,737 | A |   | 5/1998  | Daggar           |         |
| 5,867,802 | A |   | 2/1999  | Borza            |         |
| 5,884,271 | A |   | 3/1999  | Pitroda          |         |
| 5,905,434 | A |   | 5/1999  | Steffan et al.   |         |
| 5,939,975 | A |   | 8/1999  | Tsuria et al.    |         |
| 5,982,520 | A |   | 11/1999 | Weiser et al.    |         |
| 6,012,636 | A |   | 1/2000  | Smith            |         |
| 6,029,102 | A |   | 2/2000  | Elsman           |         |
| 6,041,410 | A | * | 3/2000  | Hsu et al.       | 713/186 |
| 6,078,265 | A |   | 6/2000  | Bonder et al.    |         |
| 6,085,976 | A |   | 7/2000  | Sehr             |         |
| 6,100,811 | A |   | 8/2000  | Hsu et al.       |         |

(Continued)

FOREIGN PATENT DOCUMENTS

WO     WO 99/08910     * 2/1999

OTHER PUBLICATIONS

Delaware's Permanemt Plates: 1941 to Present <http://members.aol.com/BlackTags/history/hist03.htm>, Jul. 2003.

Shelley Emling, New Driver license plan draws criticism, Palm Beach Post, May 6, 2002.

*Primary Examiner*—Donnie L. Crosland
(74) *Attorney, Agent, or Firm*—Akerman Senterfitt (57) ABSTRACT

A vehicle identification system. The system includes an electronic access card for storing information associated with a user of the electronic access card, a card reader for receiving the electronic access card and for reading the associated information and a display for receiving at least a portion of the associated information from the card reader and for displaying the portion of associated information when the user operates a vehicle. The display is located on the vehicle, and the displayed information includes at least a unique identifier assigned to the user of the electronic access card. In one arrangement, the unique identifier assigned to the user of the electronic access card can be transferrable to other vehicles such that the identifier can be displayed on any vehicle having the card reader and the display when the user operates such vehicle.

32 Claims, 7 Drawing Sheets

U.S. PATENT DOCUMENTS

| | | | |
|---|---|---|---|
| 6,112,152 A * | 8/2000 | Tuttle ..................... 701/115 |
| 6,140,939 A | 10/2000 | Flick |
| 6,144,293 A | 11/2000 | Plaschko et al. |
| 6,178,677 B1 | 1/2001 | Williams |
| 6,213,391 B1 | 4/2001 | Lewis |
| 6,219,439 B1 | 4/2001 | Burger |
| 6,224,109 B1 | 5/2001 | Yang |
| 6,259,769 B1 | 7/2001 | Page et al. |
| 6,268,793 B1 | 7/2001 | Rossi |
| 6,271,745 B1 | 8/2001 | Anzai et al. |
| 6,272,562 B1 | 8/2001 | Scott et al. |
| 6,289,114 B1 | 9/2001 | Mainguet |
| 6,297,768 B1 | 10/2001 | Allen, Jr. |
| 6,298,146 B1 | 10/2001 | Ilan et al. |
| 6,315,195 B1 | 11/2001 | Ramachandran |
| 6,328,210 B1 | 12/2001 | Kim et al. |
| 6,341,169 B1 | 1/2002 | Cadorette, Jr. et al. |
| 6,349,257 B1 | 2/2002 | Liu et al. |
| 6,353,776 B1 | 3/2002 | Rohrl et al. |
| 6,357,663 B1 | 3/2002 | Takahashi et al. |
| 6,373,148 B1 | 4/2002 | Daiss et al. |
| 6,380,643 B1 | 4/2002 | Losey et al. |
| 6,386,451 B1 | 5/2002 | Sehr |
| 6,400,040 B1 | 6/2002 | Scudder et al. |
| 6,401,551 B1 | 6/2002 | Kawahara et al. |
| 2001/0032184 A1 | 10/2001 | Tenembaum |
| 2001/0047286 A1 | 11/2001 | Walker et al. |
| 2002/0008718 A1 | 1/2002 | Obradovich |
| 2002/0021001 A1 | 2/2002 | Stratford et al. |
| 2002/0059146 A1 | 5/2002 | Keech |
| 2002/0059523 A1 | 5/2002 | Bacchiaz et al. |
| 2002/0095587 A1 | 7/2002 | Doyle et al. |

* cited by examiner

VEHICLE IDENTIFICATION SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present invention relates generally to vehicle identification systems and more particularly, to a system for displaying personal license plate numbers.

2. Description of Related Art

All U.S. states and virtually all foreign jurisdictions maintain some form of an identification system to track motor vehicle use. For example, most states in the U.S., for a small fee, issue license plates with a unique set of characters, typically alphanumeric in nature, to the owner of a vehicle when that vehicle is registered. Once issued, the owner mounts the license plate to the vehicle in a conspicuous area, normally the rear of the automobile just above the bumper. The license plate serves as proof that the vehicle to which it is mounted is a registered vehicle in the particular state emblazoned on the plate and provides a simple way to identify the vehicle. For example, many eyewitnesses will provide to police the license plate number of an automobile involved in the commission of a crime.

Generally, after several years of ownership, most states require the owner of a vehicle to turn in his or her license plate in exchange for a new one with a different set of alphanumeric characters. This requirement is primarily because the reflective coating on the license plate, which is applied to improve the legibility of the characters, begins to degrade. Additionally, when a person purchases a new vehicle, a new license plate is typically issued, even if a plate associated with the old vehicle has been registered to the buyer for a relatively short time. As such, most vehicle owners will be assigned several license plates over the course of their driving history.

There are several significant drawbacks associated with the current method of issuing license plate numbers. First, reissuing license plates can lead to bureaucratic record keeping, increased paperwork and greater expense, both for the issuing agency and the vehicle owner. Second, the owner may be misidentified as a criminal if an unauthorized driver uses the owner's vehicle during the commission of a crime and eyewitnesses provide police with the owner's license plate number. Finally, license plates are susceptible to theft, as they can be easily removed from the vehicle to which they were originally assigned and mounted on an unauthorized vehicle. In addition, the problems associated with misidentification may also appear if someone uses the stolen plate during a criminal act. Accordingly, there is a need for a system to overcome the deficiencies of the prior art without leading to complications or substantially increased costs.

SUMMARY OF THE INVENTION

The present invention concerns a vehicle identification system. The system includes an electronic access card for storing information associated with a user of the electronic access card, a card reader for receiving said electronic access card and for reading said associated information and a display for receiving at least a portion of the associated information from the card reader and for displaying the portion of associated information when the user operates a vehicle. The display is located on the vehicle, and the displayed information includes at least a unique identifier assigned to the user of the electronic access card. In one arrangement, the unique identifier can be transferrable to other vehicles such that the identifier can be displayed on any vehicle having the card reader and the display when the card reader reads the associated information. As an example, the unique identifier can be a license plate number, and the display can be located on an exterior of the vehicle.

The electronic access card can include a biometric identifier for identifying the user and can transmit an authorizing signal to the card reader when the user is biometrically identified. In addition, the card reader can read the associated information in response to the authorizing signal. In one arrangement, the biometric identifier can generate digitized images of fingerprints.

The electronic access card can include at least one electrical contact to permit the transfer of the associated information to the card reader. Moreover, the electronic access card can include a transceiver for transmitting the associated information to the card reader. As an example, the associated information stored on the electronic access card can further include at least one of a name, an address and a driving history of the user. The card reader can also include a tracking device, and the tracking device can receive navigational data concerning the vehicle.

In another arrangement, the system can further include at least one of a monitoring station and a portable unit, and the vehicle can further include a vehicle transceiver. As an example, the portable unit can be a law enforcement mobile unit. The vehicle transceiver can transmit the navigational data to at least one of the monitoring station and the portable unit. Also, the vehicle transceiver can transmits at least a portion of the information associated with the user of the electronic access card to at least one of the monitoring station and the portable unit. For example, the vehicle transceiver can transmit the navigational data and at least a portion of the associated information to at least one of the monitoring station and the portable unit using at least one communications satellite or, alternatively, a wireless communications network. In another aspect of the invention, the vehicle transceiver can transmit the navigational data and at least a portion of the associated information to at least one of the monitoring station and the portable unit in accordance with a predetermined interval.

The vehicle can further include an ignition system coupled to the card reader, and the card reader can further include an enabling circuit for enabling the ignition system. The ignition system can start an engine of the vehicle and can lock and unlock at least one door lock of the vehicle. In another arrangement, an enabling signal can be transmitted to the vehicle transceiver from the monitoring station and forwarded to the card reader. In response to the receipt of the enabling signal by the card reader, the enabling circuit can enable the ignition system, and the ignition system can start the engine of the vehicle or unlocks at least one of the door locks of the vehicle.

In yet another aspect of the invention, the vehicle can include an ignition system coupled to the card reader in which the card reader further includes an enabling circuit for disabling the ignition system. A disabling signal can be transmitted to the vehicle transceiver from the monitoring station and forwarded to the card reader. In response to the receipt of the disabling signal by the card reader, the enabling circuit can disable the ignition system, and the ignition system can stop an engine of the vehicle.

The vehicle can further include a biometric identifier for identifying the user and can transmit an authorizing signal to the card reader when the user is biometrically identified. Additionally, the card reader can read the associated information in response to the authorizing signal. In one embodiment, the biometric identifier can be positioned in the interior of the vehicle. The vehicle can further include at least one door, and the biometric identifier is mounted on the door.

In another aspect, the system can further include at least one toll booth having at least one sensor and at least one gate for controlling the flow of traffic through the toll booth. The vehicle can include a vehicle transceiver for transmitting to the sensor at least a portion of the associated information read from the electronic access card. Moreover, the portion of associated information can include at least information about the user's account with a toll collection agency. Alternatively, the electronic access card can include a transceiver for transmitting to the sensor at least a portion of the associated information stored on the electronic access card.

The vehicle can also include a panic button. When the panic button is pressed, the vehicle transceiver can transmit a distress signal to at least one of the monitoring station and the portable unit. As an example, the distress signal can include at least an emergency message and the navigational data.

The present invention also concerns a method for identifying a vehicle. The method includes the steps of providing an electronic access card and a display unit mountable on a first vehicle, assigning a unique identifier to a user of the card, storing at least the unique identifier on the card, reading the unique identifier and displaying on the display unit the unique identifier when the user operates the vehicle. The method can also include the steps of displaying on a display unit of a second vehicle the identifier when the user operates the second vehicle and biometrically identifying the user of the card. When the user is biometrically identified, the method also includes the step of performing the reading and displaying steps. As an example, the unique identifier can be a license plate number.

DETAILED DESCRIPTION OF THE PREFERRED EMBODIMENTS

Figure 1:
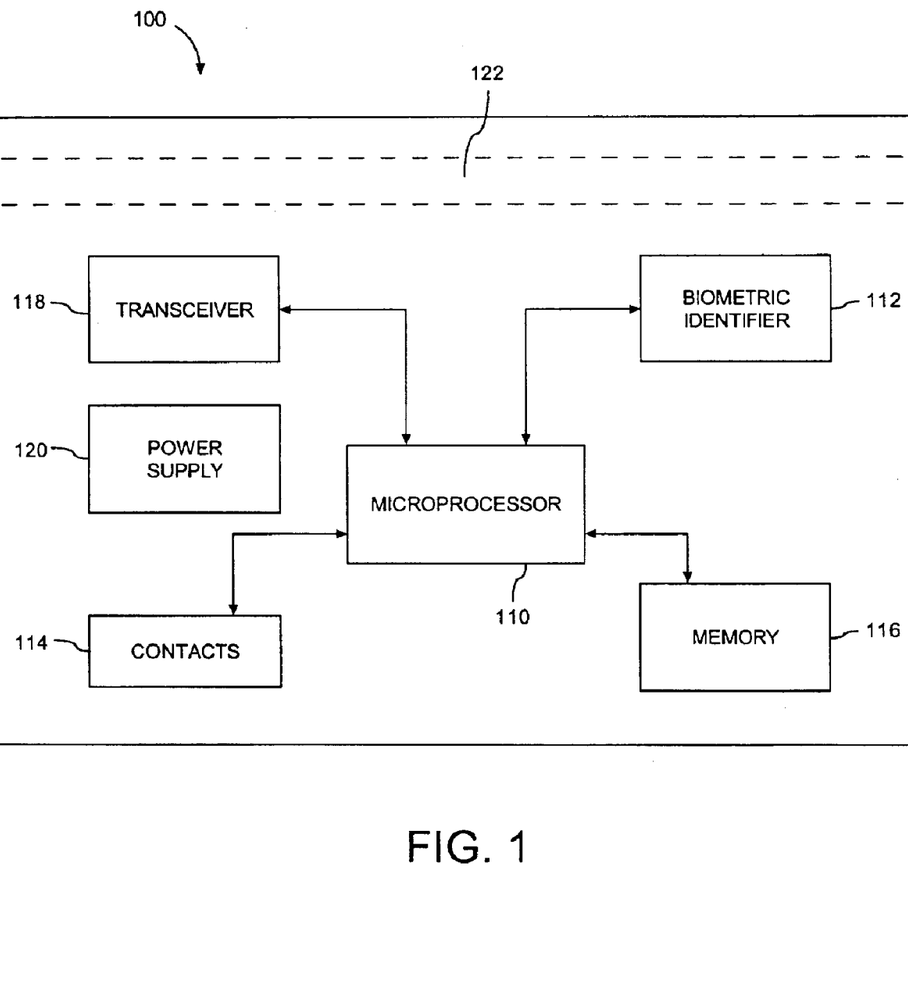
FIG. 1 illustrates an electronic access card in accordance with the inventive arrangements.

Referring to FIG. 1, an electronic access card 100 is shown. The card 100 can be used to permit a user to access, for example, a secure area, a financial account, sensitive information or a mechanized vehicle such as an automobile. The user is not necessarily limited to being the owner of the card 100, as any authorized individual may be permitted to use the card 100. In addition, the card 100 can store useful information associated with the user(s) of the card 100, examples of which will be described later. For convenience, the card 100 can be roughly the size of a conventional credit card. It must be noted, however, that the card 100 can be any other suitable size.

The card 100 can include a microprocessor 110, a biometric identifier 112, one or more electrical contacts 114, a memory 116, a transceiver 118 and a power supply 120. The card 100 can also include one or more magnetic strips 122 for storing information in a manner similar to that employed by conventional credit cards. Control and data interfaces can also be provided for permitting the microprocessor 110 to access or to control the operation of the biometric identifier 112, the electrical contacts 114, the memory 116 and the transceiver 118. The microprocessor 110 can also be provided with suitable software or firmware for the conventional operations performed by the microprocessor 110. Further, the microprocessor 110 can be provided with program routines in accordance with the inventive arrangements.

The biometric identifier 112 can measure any suitable biometric characteristic of a person in possession of the card 100, can convert this measurement into a digital signal and can transfer the signal to the microprocessor 110. For example, the biometric identifier 112 can be designed to perform fingerprint scans, voice analyses and retinal or iris scans. Those of ordinary skill in the art, however, will appreciate that the invention is not limited to these examples, as the biometric identifier 112 can measure other biometric characteristics. The biometric identifier 112 will be described in detail later.

The electrical contacts 114 can be used to create a signal path from external components to the microprocessor 110, which can facilitate the transfer of virtually any type of data between the microprocessor 110 and such components. As an example, the card 100 may be inserted in a card reader having its own biometric identifier (not shown). In this case, the user of the card 100 can provide a biometric sample to the biometric identifier of the card reader, and the card reader can generate a signal to be transferred through the electrical contacts 114 to the microprocessor 110. Based on the type of signal generated, the microprocessor 110 can determine whether the user is authorized to use the card 100. Also, authorized biometric samples may be transferred from an external component to the memory 116 through the electrical contacts 114. It is understood, however, that the invention is not limited to the above examples, as other types of data can be transferred to the microprocessor 110 through the electrical contacts 114.

The memory 116 can be any suitable memory capable of storing digitized biometric samples previously measured by the biometric identifier 112 as well as other types of information concerning the owner of the card 100. For example, the memory 116 can be used to store digitized images of fingerprints, digitized samples of a person's voice or digitized images of a person's retina or iris. In addition, examples of information pertinent to the user of the card 100 that can be stored in the memory 116 include name, address, social security number, account information, driver license number, driving record, criminal history (if any), insurance coverage and vehicle registration. One or more digital photographs of the user of the card 100 may also be stored in the memory 116. Those of ordinary skill in the art, however, will appreciate that the memory 116 can store other suitable types of data. Also, the magnetic strip 122 can store at least a portion of the data stored in the memory 116 to permit the card 100 to be used with conventional card readers.

The memory can be programmable read only memory (PROM), erasable programmable read only memory (EPROM), electrically erasable programmable read only memory (EEPROM) or flash memory. Of course, other types of memory may be used with the invention. In one arrangement, the memory 116 can be interchangeable or replaceable so that chips containing pre-stored data may be used. Alternatively, if the memory 116 is programmable or erasable, the memory 116 can be updated or reprogrammed through the electrical contacts 114 and the microprocessor 110.

The transceiver 118 can transmit and receive radio frequency (RF) signals, process these signals and forward them to the microprocessor 110 when RF signals are received by the transceiver 118 or forward them to an external receiver or transceiver when RF signals are transmitted from the transceiver 118. Any suitable standard can be used to transmit the RF signals. For purposes of the invention, the term radio frequency can include any electromagnetic wave capable of being wirelessly propagated through a suitable medium. The transceiver 118 enables the card 100 to wirelessly receive and transmit data that can be transmitted to or from the card 100 through the electrical contacts 114. For example, if the memory 116 is programmable or erasable, data can be transmitted from an external transmitter (not shown) and can be received by the transceiver 118, which can forward the data to the microprocessor 110. The microprocessor 110 can then transmit the data to the memory 116. Moreover, the transceiver 118 can receive authorizing signals from an external biometric identifier (not shown) if the user has provided a biometric sample to the external biometric identifier. Thus, if the user is an authorized user, such a status can be wirelessly forwarded to the microprocessor 110 through the transceiver 118.

The power supply 120 can provide power to one or more of the components of the card 100. For example, the power supply 120 can provide power to the microprocessor 110, the biometric identifier 112 and the transceiver 118. In another arrangement, the card 100 can receive power from an external source through the electrical contacts 114. These embodiments are not mutually exclusive, as the card 100 can include its own power supply 120 and can also receive power through the electrical contacts 114. As an example, the power supply 120 can be one or more batteries, and the batteries can be interchangeable or replaceable.

In operation, a user can provide a biometric sample to the biometric identifier 112. The biometric identifier 112 can measure the biometric sample and can convert this measurement into a digital signal. The biometric identifier 112 transmits the digital signal to the microprocessor 110, which then can compare the digitized sample with biometric samples stored in the memory 116. If there is a match, the microprocessor 110 can transmit an authorizing signal to an external reader (not shown) through the electrical contacts 114 or the transceiver 118. In addition to the authorizing signal, the microprocessor 110 can forward relevant information about the user to the external reader through the electrical contacts 114 or the transceiver 118. The external reader can transmit data to the microprocessor 110 (and on to the memory 116 if desired) through the electrical contacts 114 and/or the transceiver 118.

Figure 2:
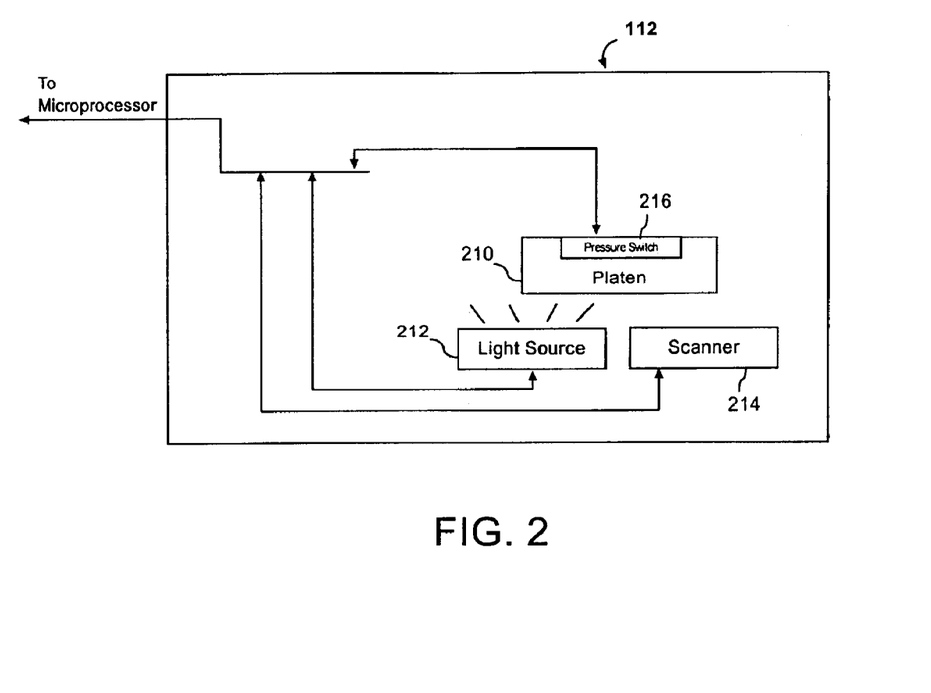
FIG. 2 illustrates a biometric identifier in accordance with the inventive arrangements.

Referring to FIG. 2, an example of a biometric identifier 112 in accordance with the inventive arrangements is shown. In this example, the biometric identifier 112 can generate digitized images of fingerprints and forward these digital signals to the microprocessor 110. The biometric identifier 112 can include a platen 210, a light source 212, a fingerprint scanner 214 and a pressure switch 216.

The light source 212 can direct light towards the platen 210 and can be, for example, a light emitting diode. The platen 210 can also be transparent to the wavelength of the emitted light and can contain the pressure switch 216, which can be electrically coupled to the microprocessor 110. The pressure switch 216 can detect when a user has placed his or her finger on the platen 210 and can signal the microprocessor 110. In addition, the microprocessor 110 can control the operation of the light source 212 and the fingerprint scanner 214. The fingerprint scanner 214 can be any biometric device capable of scanning fingerprint images and converting these images into digitized images.

A user can place his or her finger on the platen 210, and the pressure switch 216 can detect this contact and can signal the microprocessor 110. The microprocessor 110 can signal the fingerprint scanner 214 and the light source 212, which can emit the light needed to create a scanned image of the user's fingerprint. The light can pass through the platen 210 and can strike the user's finger, which can cause the light to be reflected to the fingerprint scanner 214.

From the reflected light, the fingerprint scanner 214 can generate a scanned image of the user's fingerprint and can convert the image into a digital signal. The fingerprint scanner 214 can forward this signal to the microprocessor 110, which can compare the digitized image with authorized images that are stored in the memory 116. If there is a match, the microprocessor 110 can transmit an authorizing signal through the electrical contacts 114 (see FIG. 1) or the transceiver 118 (also see FIG. 1).

Authorized fingerprint images can be loaded into the memory 116 at any time. For example, the owner of the card 100 and any other authorized users can have digitized images of their fingerprints generated by an external scanner and transferred to the memory 116 through the electrical contacts 114 or the transceiver 118. This process can occur when the card 100 is first activated or at any time following its activation. In addition, the owner of the card 100 can have previously authorized fingerprint images removed from the memory 116 by an external card reader containing suitable software and circuitry.

In another arrangement, the microprocessor 110 can include a clock that measures the amount of time that has passed since the confirmation of an authorized fingerprint. Additionally, the microprocessor 110 can be programmed to disable the card 100 after a predetermined time interval following this confirmation to limit the possibility of unauthorized use of the card 100. For example, once the microprocessor 110 verifies that a user that has had his or her fingerprint scanned is permitted to use the card 100, the microprocessor 110 can disable the card 100 one minute later. The microprocessor 110 can disable the card 100 through a variety of ways, including by blocking the transfer of data to and from the card 100.

Of course, the card 100 can be re-activated once it is disabled if the authorized user provides another fingerprint sample. The microprocessor 110 can also be programmed to initiate another scanning and comparison process just prior to the exhaustion of the predetermined time interval. As a result, the authorized user may continuously keep his or her finger on the platen 210 to override the disabling feature. As will be explained later, a signal can be transmitted to the microprocessor 110 from an external component that can override this disabling feature. It is understood that the predetermined time interval can be any suitable length of time. Moreover, other suitable measures to prevent illegal use of the card following initial authorization may be employed.

Although one example of a biometric identifier 112 has been presented, it is important to note that the invention is in no way limited to this particular system. Those of ordinary skill in the art will appreciate that other systems suitable for measuring biometric characteristics can be used. For example, the biometric identifier 112 can be designed to perform iris or retinal scans. In fact, the invention does not require the use of biometric identifier 112, as the card 100 of FIG. 1 can operate without such a device.

Figure 3:
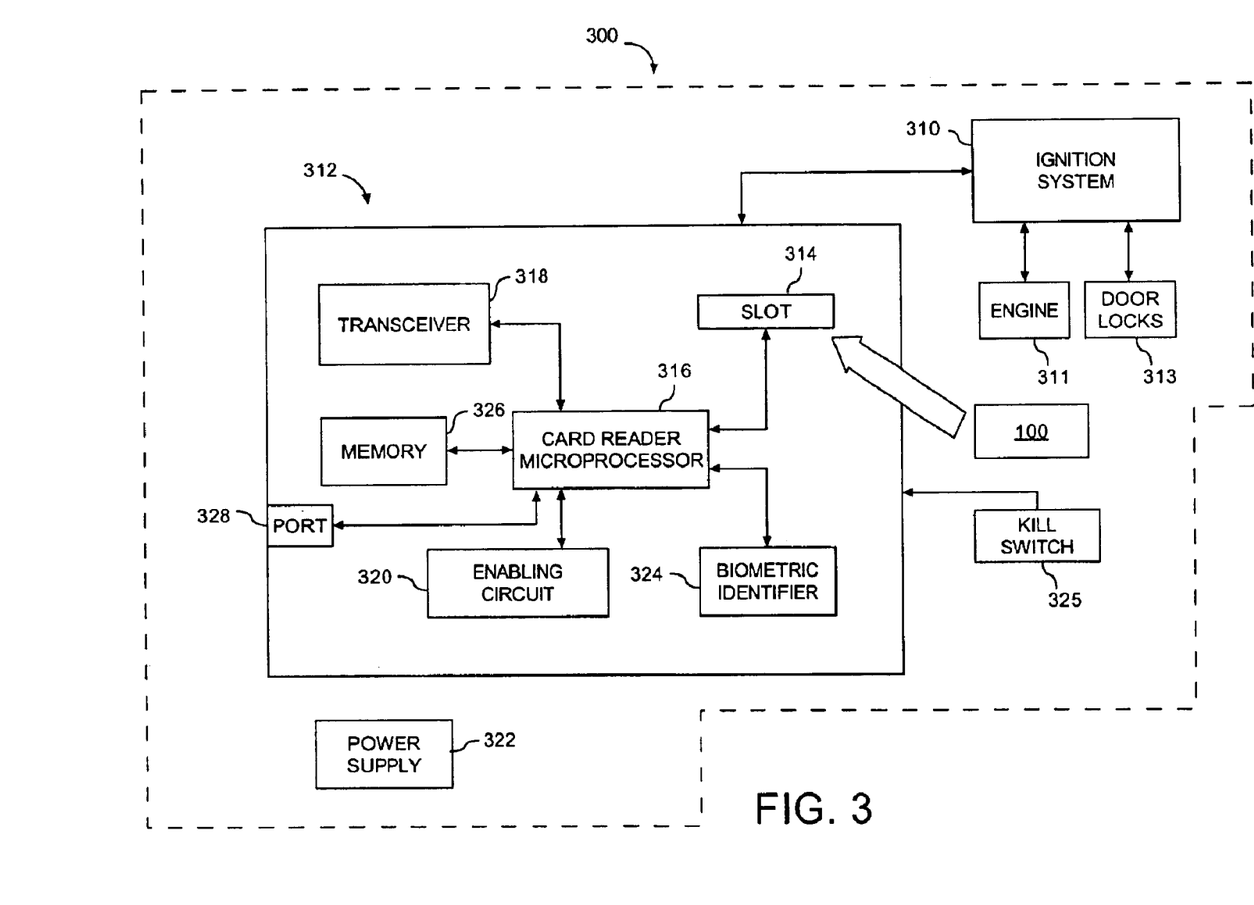
FIG. 3 illustrates a vehicle in which access to the vehicle is controlled by the electronic access card of FIG. 1 in accordance with the inventive arrangements.

The card 100 can be used to allow its owner or other authorized users access to a wide variety of things. An example of how the card can provide access to a vehicle is shown in FIG. 3. The vehicle can be any mechanized form of transportation, such as automobiles, locomotives, airplanes or ships. The vehicle can also be a form of transportation in which the primary force of locomotion is provided by a human, such as a bicycle. The card 100 can provide access to an ignition system of a vehicle or some other critical component of operation.

In this example, the card 100 can provide a user with access to an ignition system 310 of a vehicle 300. The vehicle 300 can include a card reader 312, which can be electrically coupled to the ignition system 310. As an example, the card reader 312 can be mounted inside a passenger compartment (not shown) of the vehicle 300, preferably within a comfortable reaching distance of the steering means of the vehicle 300. It is understood, however, that the card reader 312 can be positioned at any other suitable location in or on the vehicle 300. The ignition system 310 can start an engine 311 of the vehicle 300 and can include circuitry to unlock or lock one or more door locks 313 of the vehicle 300. As will be described below, the card reader 312 can transmit a signal to the ignition system 310 to allow a driver to start the vehicle 300 or unlock one or more of its doors.

Referring to FIGS. 1 and 3, the card reader 312 can include a slot 314 for receiving the card 100, a card reader microprocessor 316, a transceiver 318 and an enabling circuit 320 for selectively enabling or disabling the ignition system 310. The card reader 312 can receive power from a power supply 322. In one arrangement, the power supply 322 can be associated with the vehicle 300. For example, the power supply 322 can be an automobile battery; however, other suitable power supplies can be used to power the card reader 312.

The slot 314 can include electrical contacts (not shown), which can be used (along with the electrical contacts 114 of the card 100) to complete a circuit path (not shown) between the card reader microprocessor 316 and the microprocessor 110 of the card 100 when the card 100 has been inserted in the slot 314. This path can be used for the transmission of data between these components. In addition, the circuit path can be used to provide power from the power supply 322 to one or more of the components of the card 100. In another arrangement, the transceiver 318 of the card reader 312 can wirelessly transmit data to or receive data from the transceiver 118 of the card 100 or any other suitable transceiver or transmitter.

As an example, when the user of the card 100 is biometrically identified by the card 100, the user can insert the card 100 into the slot 314 of the card reader 312. The microprocessor 110 of the card 100 can signal the card reader microprocessor 316—through the electrical contacts 114—that the card 100 has been enabled by an authorized user. In response, the card reader microprocessor 316 can signal the enabling circuit 320, which in turn can enable the ignition system 310 for starting the engine 311. As another example, when the user of the card 100 is identified, the microprocessor 110 of the card 100 can signal the card reader microprocessor 316 through the transceiver 118 of the card 100 and the transceiver 318 of the card reader 312. Further, the card reader microprocessor 316 can signal the enabling circuit 320 to enable the ignition system 310 for starting the engine 311 or unlocking one or more of the door locks 313 of the vehicle 300.

In either arrangement, the card reader microprocessor 316 can transmit a signal (through the electrical contacts 114 or the transceiver 318 and the transceiver 118) back to the microprocessor 110 informing the microprocessor 110, for example, that the engine of the vehicle 300 has been started. The microprocessor 110 can then override the disabling feature associated with the biometric identification of the user. This way, the user is not required to continuously provide a biometric sample to keep the ignition system 310 enabled and, hence, the engine 311 running.

Figure 4:
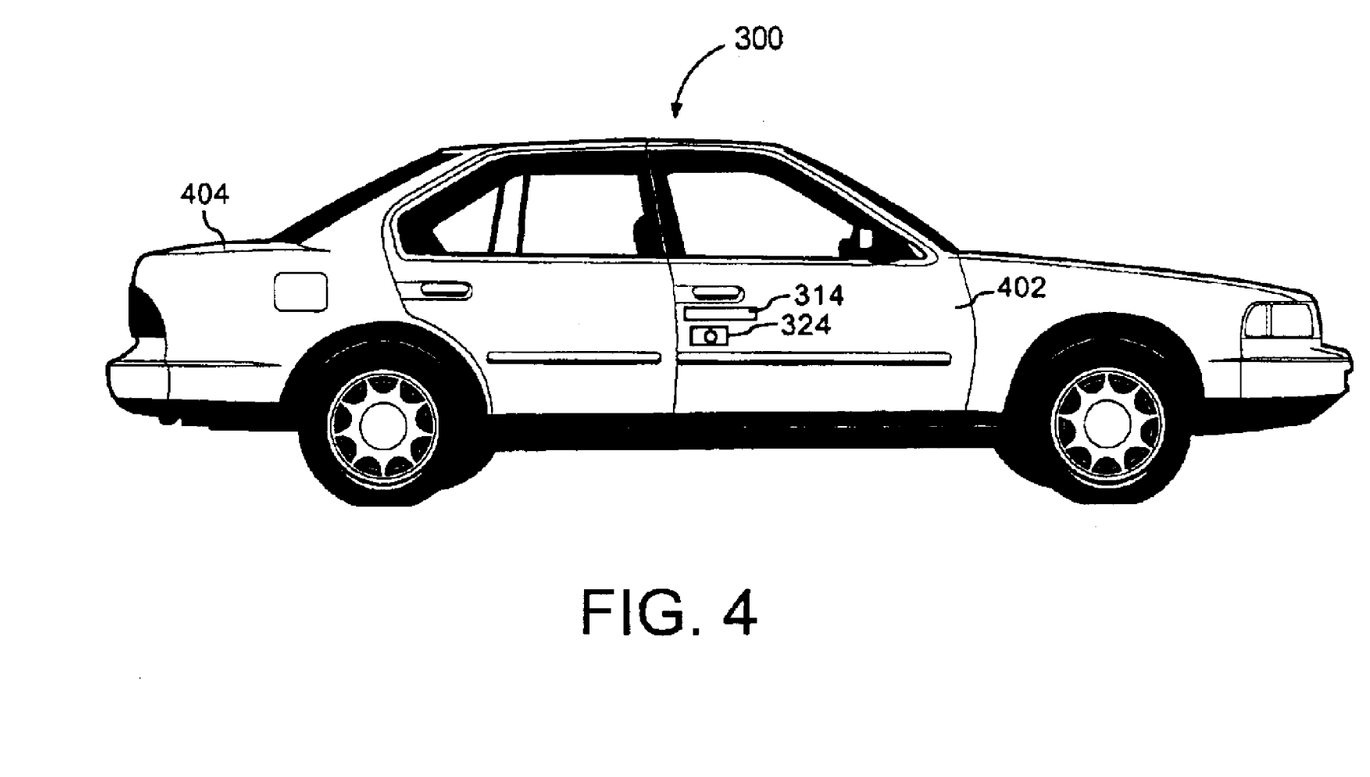
FIG. 4 illustrates a slot of a card reader positioned on an exterior of a vehicle in accordance with the inventive arrangements.

Although FIG. 3 illustrates the slot 314 as being integrated with the card reader 312, the invention is not so limited. For example, referring to FIG. 4, the slot 314 can be positioned on one or more doors 402 of the vehicle 300. The slot 314 can also be positioned on a trunk 404 of the vehicle 300.

Referring back to FIG. 3, if the card 100 does not include its own power source, the user can insert the card 100 into the slot 314, and as noted earlier, power can be transferred from the power supply 322 to the components of the card 100. At this point, the biometric identifier 112 can perform the biometric measurement and the microprocessor 110 can execute the comparison step. In accordance with the above discussion, if the user is an authorized user, the microprocessor 110 of the card 100 can then send an authorization signal to the card reader microprocessor 316 through the circuit path created by the insertion of the card 100 in the slot 314. Alternatively, the microprocessor 110 can signal the card reader microprocessor 316 through the transceiver 118 of the card 100 and the transceiver 318 of the card reader 312.

In another embodiment, the card reader 312 can include a biometric identifier 324, which can be used in place of the biometric identifier 112 on the card 100. Similar to the biometric identifier 112 on the card 100, the biometric identifier 324 can perform a biometric measurement, convert the measurement into a digital signal and transmit the signal to the card reader microprocessor 316. The card reader 312 can also include a memory 326 for storing authorized biometric samples for comparison with biometric measurements that the biometric identifier 324 performs. The overall operation of the biometric identifier 324 and the processes used to confirm the identity of a user are similar to the operation described in relation to FIGS. 1 and 2, and as such, no further description is warranted. The biometric identifier 324 can be constructed to perform fingerprint, iris or retinal scans or voice analysis, although the biometric identifier 324 is not limited to receiving these particular types of biometric measurements. As another example and referring back to FIG. 4, a biometric identifier 324 may also be mounted on one or more doors 402 or the trunk 404 of the vehicle 300.

Continuing with FIG. 3, the card reader 312 can also include a port 328. The port 328 can be used to transfer data between the card reader 312 and an external component. For example, authorized biometric samples that have been digitized can be transferred through the port 328 to the memory 326. Those of ordinary skill in the art will appreciate that the invention is not limited to this example, as any other suitable type of data can be transferred to the card reader 312 through the port 328. In addition, the biometric identifier 324 can be used to generate authorized biometric measurements for storage in the memory 326. These digitized measurements can be compared with subsequently measured samples to confirm that the provided sample is from an authorized user.

After the engine 311 has been started, there are several ways to shut it off. For example, the user can merely remove the card 100 from the slot 314, and the card reader microprocessor 316 can signal the enabling circuit 320. The enabling circuit 320 can then disable the ignition system 310, which can cause the engine 311 to stop. Alternatively, the vehicle 300 can include a kill switch 325 for stopping the engine 311. Specifically, the user can depress the kill switch 325, which can signal the card reader microprocessor 316. Like the example above, the card reader microprocessor 316 can signal the enabling circuit 320 to disable the ignition system 310 and, hence, the engine 311. The kill switch 325 may be particularly useful, for example, if the authorization signal from the card 100 was wirelessly transmitted, i.e., the card 100 was never inserted in the slot 314.

Although the card 100 has been illustrated as providing access to a vehicle, particularly one with an engine, it must be noted that the invention is not limited in this regard. For example, the card 100 can be used to provide access to non-mechanized vehicles. In addition, the card 100 can be used to provide access to other forms of machinery. Specifically, the card 100 can provide access to automatic teller machines, entrances to buildings or residences, safes or safety deposit boxes, computers or any other device that may warrant restriction to its access by the general public.

Figure 5:
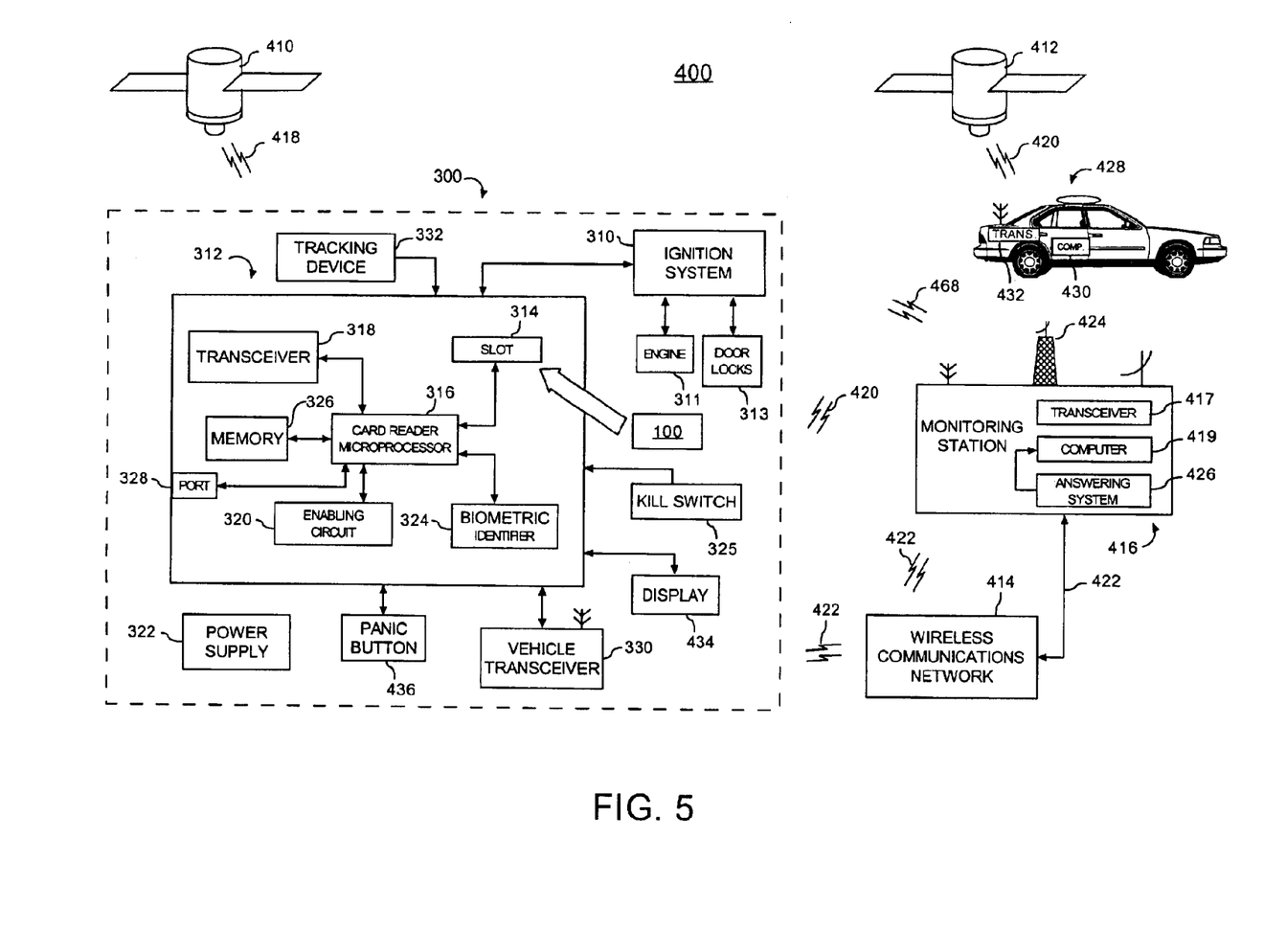
FIG. 5 illustrates a vehicle monitoring system in accordance with the inventive arrangements.

Referring to FIG. 5, the vehicle 300 can be part of a vehicle identification system 400. In this arrangement, the vehicle 300 can also include a vehicle transceiver 330 and a tracking device 332. The system 400 can include one or more tracking satellites 410, one or more communications satellites 412, a wireless communications network 414 and one or more monitoring stations 416. The monitoring station 416 can include a transceiver 417 and one or more computers 419. In addition, the tracking device 332 can receive navigational data from the tracking satellites 410 and can forward this data to the card reader microprocessor 316. In one arrangement, the tracking device 332 of the vehicle 300 can be a global positioning system (GPS) receiver and the tracking satellites 410 can be GPS satellites. Further, the navigational data can include GPS coordinates such as a latitude coordinate, a longitude coordinate and an altitude coordinate. The tracking satellites 410 can communicate with the tracking device 332 over a satellite communications link 418, which can be any link suitable for broadcasting RF signals from the tracking satellites 410 to the tracking device 332.

The vehicle transceiver 330 can transmit data to or receive data from the transceiver 417 of the monitoring station 416. In one arrangement, data can be transmitted between the vehicle transceiver 330 and the transceiver 417 of the monitoring station 416 over a communications link 420 facilitated by the communications satellite 412. The communications link 420 can be any communications link suitable for broadcasting RF signals between the vehicle transceiver 330, the communications satellite 412 and the transceiver 417 of the monitoring station 416. Alternatively, data can be transmitted between the vehicle transceiver 330 and the transceiver 417 of the monitoring station 416 over a communications link 422 and the wireless communications network 414.

As is known in the art, the wireless communications network 414 can include, for example, wireless repeaters, base station units and switches for facilitating communications between a wireless unit and the public switched telephone network (PSTN) or another wireless unit. Thus, in addition to supporting any suitable type of RF communications, the communications link 422 may also include portions of a hard-wired communications connection, as shown in FIG. 5. The transceiver 417 of the monitoring station 416 can receive any hard-wired connections in addition to wireless signals. For purposes of the invention, when referring to any transmissions between the vehicle transceiver 330 and the transceiver 417 of the monitoring station 416, it is assumed that such a transmission can be sent over the communications link 420 or the communications link 422 unless otherwise noted.

Virtually any type of data can be transmitted between the vehicle 300 and the monitoring station 416. For example, the card reader microprocessor 316 can forward the navigational data that it receives to the vehicle transceiver 330, which can then transmit such data to the transceiver 417 of the monitoring station 416. As another example, the card reader microprocessor 316 can forward information that is stored on the card 100 to the vehicle transceiver 330 for transmission to the transceiver 417.

Any data received by the transceiver 417 of the monitoring station 416 can be displayed on the computer 419. Accordingly, operators at the monitoring station 416 can have access to the whereabouts of a particular vehicle 300 and any relevant information associated with the user of the card 100 that is stored on the card 100. For example, the name, address, age, driver license number, license plate number, driving history, criminal history, vehicle registration and insurance coverage of the user in addition to the location of the vehicle 300 can be displayed on the computer 419 of the monitoring station 416. One or more digital photographs of the user may also be displayed on the computer 419. It is understood, however, that other suitable types of information can be stored on the card 100 and eventually displayed on the computer 419.

In another embodiment, information concerning the user of the card 100 can be transmitted from the computer 419 through the transceiver 417 of the monitoring station 416 to the vehicle transceiver 330 and the card reader microprocessor 316. The card reader microprocessor 316 can then transfer this information to the card 100 through any of the techniques discussed in relation to FIG. 3. As an example, if the user of the card 100 has received a traffic citation, the driving history of the user of the card 100 can be updated at computer 419 of the monitoring station 416, and this update can be forwarded to the card reader microprocessor 316 and eventually the card 100.

A disabling signal can also be transmitted from the monitoring station 416 to the vehicle 300. Specifically, the computer 419 can generate the disabling signal, and the signal can be transmitted to the card reader microprocessor 316 through the transceiver 417 of the monitoring station 416 and the vehicle transceiver 330. In response, the card reader microprocessor 316 can signal the enabling circuit 320, which can then disable the ignition system 310 or any other component of the vehicle vital to its operation. Disabling the ignition system 310 can stop the engine 311 of the vehicle 300. Such a feature can be useful, for example, if the vehicle 300 has been stolen or if the owner of the vehicle 300 is wanted by a law enforcement agency.

Other signals may be forwarded from the monitoring station 416 to the vehicle 300 as well. For example, if the system 400 uses GPS technology to determine the location of the vehicle 300, the system 400 can employ differential GPS to produce more accurate readings. As is known in the art, differential GPS technology relies on a stationary GPS receiver with known GPS coordinates for correcting errors in the transmissions from GPS satellites to other stationary or mobile targets containing GPS tracking devices. As an example, a differential tracking device 424 can be built into the monitoring station 416 and can receive signals from the tracking satellites 410 over the satellite communications link 418.

The differential tracking device 424, because its GPS coordinates have previously been accurately measured, can generate an error correction factor that can be used to error correct the transmissions from the tracking satellites 410. The error correction factor can be transmitted from the transceiver 417 of the monitoring station 416 to the vehicle transceiver 330 and the card reader microprocessor 316. The card reader microprocessor 316 can use this error correction factor to produce a more accurate reading of the GPS coordinates of the vehicle 300.

It is understood, however, that the differential tracking device 424 is not limited to being positioned at the monitoring station 416, as any number of differential tracking devices 424 can be placed at other suitable locations. Moreover, the system 400 can be designed to rely on pre-existing differential tracking devices 424 constructed by, for example, a governmental agency. Nevertheless, the use of differential GPS is not a requirement of the invention; in fact, it must be stressed that the invention is not limited to tracking a vehicle 300 through the use of GPS technology, as any other technique for locating the vehicle 300 can be practiced with the invention.

Enabling signals for starting the ignition system 310 can also be transmitted from the monitoring station 416 to the vehicle 300. In particular, once the user has been biometrically identified, the card reader microprocessor 316 can generate an authorizing signal, which can be transmitted to the computer 419 of the monitoring station 416 through the vehicle transceiver 330 and the transceiver 417. In response, the computer 419 can produce an enabling signal, which can be transmitted from the transceiver 417 to the vehicle transceiver 330 and, in turn, the card reader microprocessor 316. The card reader microprocessor 316 can signal the enabling circuit to activate the ignition system 310 to start the engine 311 or unlock one or more of the door locks 311 of the vehicle 300.

The transmission of an enabling signal from the monitoring station 416 to the vehicle 300 may also be performed if the user of the card 100 has misplaced the card 100, if the card 100 has been stolen or if the user has accidentally locked the card 100 in the vehicle 300. Specifically, the user can be provided with a telephone number or Web site address for contacting the monitoring station 416 and a password unique to the user. If necessary, the user can contact the monitoring station 416 and can provide his or her password. The password can be given to a live person or can be received by an answering system 426 at the monitoring station 416. The answering system 426 can include suitable voice recognition software to permit the user to speak his or her password or can include circuitry for receiving tones from a touch-tone telephone. The answering system 426 can also include suitable software and circuitry for receiving the password over the Internet or some other communications network.

The live person or the answering system 426 can enter the received password into the computer 419, which can generate an enabling signal. In accordance with the above discussion, the enabling signal can be forwarded to the card reader microprocessor 316, which can signal the enabling circuit 320 to cause the ignition system 310 to start the engine 311 of the vehicle 300 or to unlock one or more of the door locks 313 of the vehicle 300. Although unique to the user of the card 100, the user may choose to share his or her password with friends or family to allow such persons access to the vehicle 300.

Signals can also be transmitted between the vehicle 300 and a portable unit 428 in lieu of or in addition to the monitoring station 416. As an example, the portable unit 428 can be a police cruiser or any other law enforcement mobile unit. It is understood, however, the portable unit 428 can be associated with other types of agencies. The portable unit 428 can include a computer 430 and a transceiver 432 to facilitate the transmission of signals between the portable unit 428 and the vehicle 300. As a result, all or at least a portion of the features associated with the monitoring station 416 can be performed by the portable unit 428.

For example, if the vehicle 300 is within the range of the transceiver 432 of the portable unit 428, information associated with the user of the card 100 can be transmitted from the vehicle transceiver 330 to the transceiver 432. The received data can then be displayed on the computer 430 of the portable unit 428. Thus, if the vehicle 300 is stopped by the portable unit 428, the operator of the portable unit 428, which may be a law enforcement officer, can have access to the driving history or criminal history of the operator of the vehicle 300, i.e., the user of the card 100. The operator of the portable unit 428, informed of potentially troubling history concerning the operator of the vehicle 300, can take whatever precautionary steps that are warranted.

In one arrangement, the information being transmitted from the vehicle 300 can be transmitted in accordance with a predetermined interval. For example, the card reader microprocessor 316 can instruct the vehicle transceiver 330 to broadcast the information that it receives from the card reader microprocessor 316 (e.g., driver information, GPS coordinates) every few seconds or minutes. For longer time intervals, less power is consumed from the power supply 322, which may become an issue if the engine 311 of the vehicle 300 is off. Accordingly, the card reader microprocessor 316 can monitor the power supply 322 and can adjust the time between transmissions to preserve power.

During the time interval, the card reader microprocessor 316 may enter a passive stage in which only the most vital functions are performed. Once the time interval is over, the card reader microprocessor 316 can enter an active stage. In the active stage, the card reader microprocessor 316 can receive information from the tracking device 332 and can update, if necessary, any information concerning the user of the card 100. The card reader microprocessor 316 can then instruct the vehicle transceiver 330 to transmit the updated data to the monitoring station 416 or the portable unit 428. Once the data is transmitted, the card reader microprocessor 316 may reenter the passive stage, and another time interval may begin. This feature can increase the efficiency of the card reader 312 by lowering its power consumption.

In another arrangement, an activation signal can be transmitted from the transceiver 417 of the monitoring station 416 or the transceiver 432 of the portable unit 428 to the vehicle transceiver 330 and to the card reader microprocessor 316. The card reader microprocessor 316 can enter the active stage and can perform whatever tasks that are typically performed during the active stage. As a result, operators in the monitoring station 416 or the portable unit 428 may instantaneously access information about the vehicle 300 and the user of the card 100.

In another embodiment of the invention, each user of the card 100 can be assigned one or more unique identifiers. The assigned identifiers can be unique in that each identifier will be given to only one user. For purposes of the invention, the term "unique identifier" can include any suitable sequence of characters, such as alphanumeric characters, used to identify a particular person or a registration out of a pool of other individuals or registrations. As an example, the unique identifier can be a license plate number, a driver license number or an insurance account number. A government agency or any other authorized entity can assign the unique identifiers, and the identifiers can be permanent such that each assignee may keep the assigned identifier throughout his or her lifetime or for the duration of the function with which the identifier is associated. For example, if the unique identifier is a license plate number, the assignee may keep the assigned license plate number for his or her driving history.

Referring to FIG. 1, each individual using the card 100 may have his or her unique identifier transferred to the card 100 from an external system to the microprocessor 110 through the transceiver 118 or the electrical contacts 114. The microprocessor 110 can then transfer to the memory 116 for storage any number of the unique identifiers. Referring to FIGS. 1 and 5, when the user of the card 100 is biometrically identified and the card 100 is inserted in the slot 314 of the card reader 312, the card reader microprocessor 316 can access this particular user's assigned identifier through the electrical contacts 114. Alternatively, the identifier can be transferred to the card reader microprocessor 316 through the transceiver 118 of the card 100 and the transceiver 318 of the card reader 312.

In addition, the unique identifier can be transmitted to the computer 419 of the monitoring station 416 or the computer 430 of the portable unit 428 in accordance with the above discussion. Thus, the user's unique identifier can be displayed at the computer 419 or the computer 430 with other information concerning the user.

Referring to FIG. 5 only, the user's unique identifier can also be displayed on the vehicle 300. For example, the vehicle 300 can include a display 434 for displaying the identifier of the user of the card 100. In one arrangement, the display 434 can be a liquid crystal display having a backlit display. Such a display 434 can increase the visibility of the identifier. Those of ordinary skill in the art, however, will appreciate that other suitable display units can be used with the invention. In fact, the display 434 is not limited to a purely electronic display, as electromechanical or simply mechanical displays can be used as well.

The card reader microprocessor 316 can forward to the display 434 the identifier that has been assigned to the user of the card 100 that has been biometrically identified. The display 434 can then display the user's identifier. This feature of the card 100 is applicable to any vehicle 300 having a card reader 312 and a display 434. As such, the user's unique identifier can be transferrable such that it can be displayed on any vehicle 300 that he or she operates and that is equipped with these components.

Figure 6:
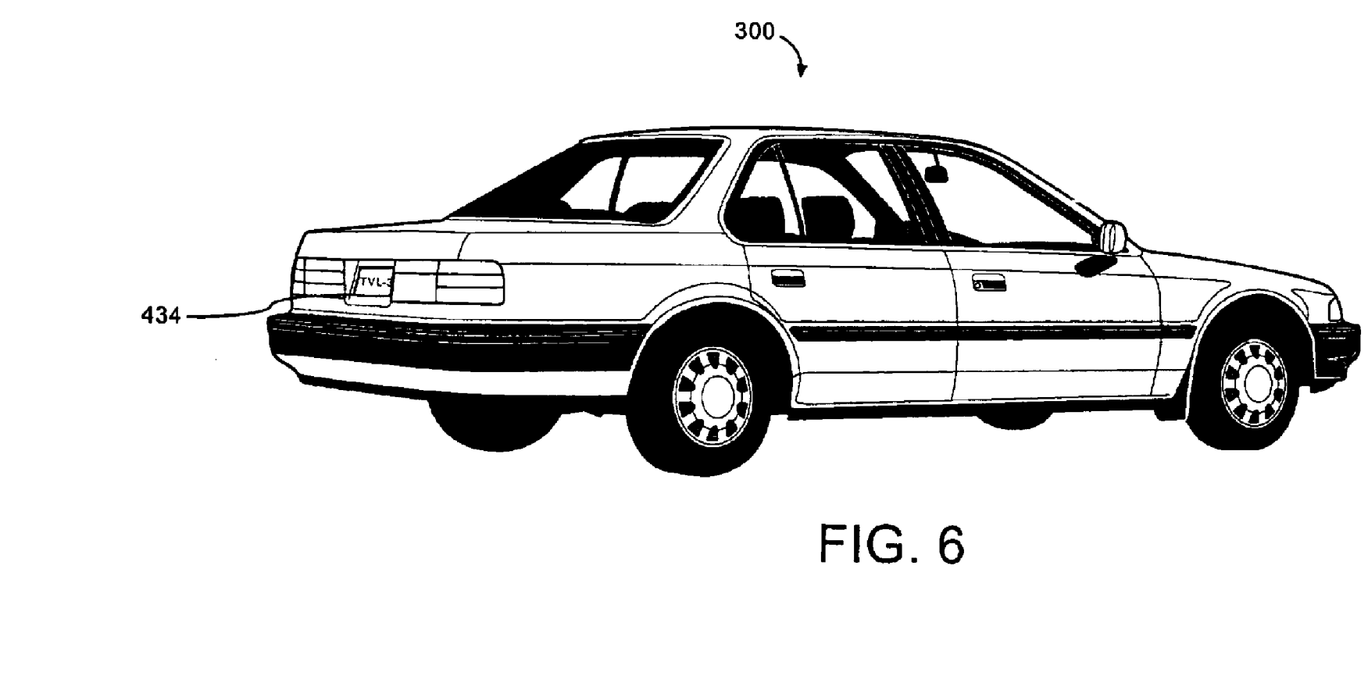
FIG. 6 illustrates a vehicle having a display for displaying license plate numbers in accordance with the inventive arrangements.

The display 434 can be positioned at any suitable location on the vehicle 300. In one arrangement, the display 434 can be mounted on the rear of the vehicle 300, just below the bumper. This configuration is illustrated in FIG. 6. Notably, many states require conventional license plates to be mounted on a motorized vehicle in this area.

Referring back to FIG. 5, the vehicle 300 can include one or more panic buttons 436. In one arrangement, the panic button 436 may be positioned near the driver's seat of the vehicle 300 for easy access by the user of the card 100 if the user is driving the vehicle 300. Of course, the panic button 436 may be positioned at any other suitable location inside or even outside the vehicle 300. When the panic button 436 is pushed, a signal can be forwarded to the card reader microprocessor 316 of the card reader 312. The card reader microprocessor 316 can then instruct the vehicle transceiver 330 to transmit a distress signal to either the transceiver 417 of the monitoring station 416 or the transceiver 432 of the portable unit 428 or both. The navigational data of the vehicle 300 and any relevant information associated with the user of the card 100 may also be transmitted to the monitoring station 416 and/or the portable unit 428 in addition to the distress signal.

The distress signal received by the monitoring station 416 or the portable unit 428 may contain an emergency message such as "Send Help Immediately," which can be displayed at the computer 430 of the portable unit 428 or the computer 419 of the monitoring station 416. The card reader microprocessor 316 may be programmed with the emergency message prior to the activation of the overall system 400.

Figure 7:
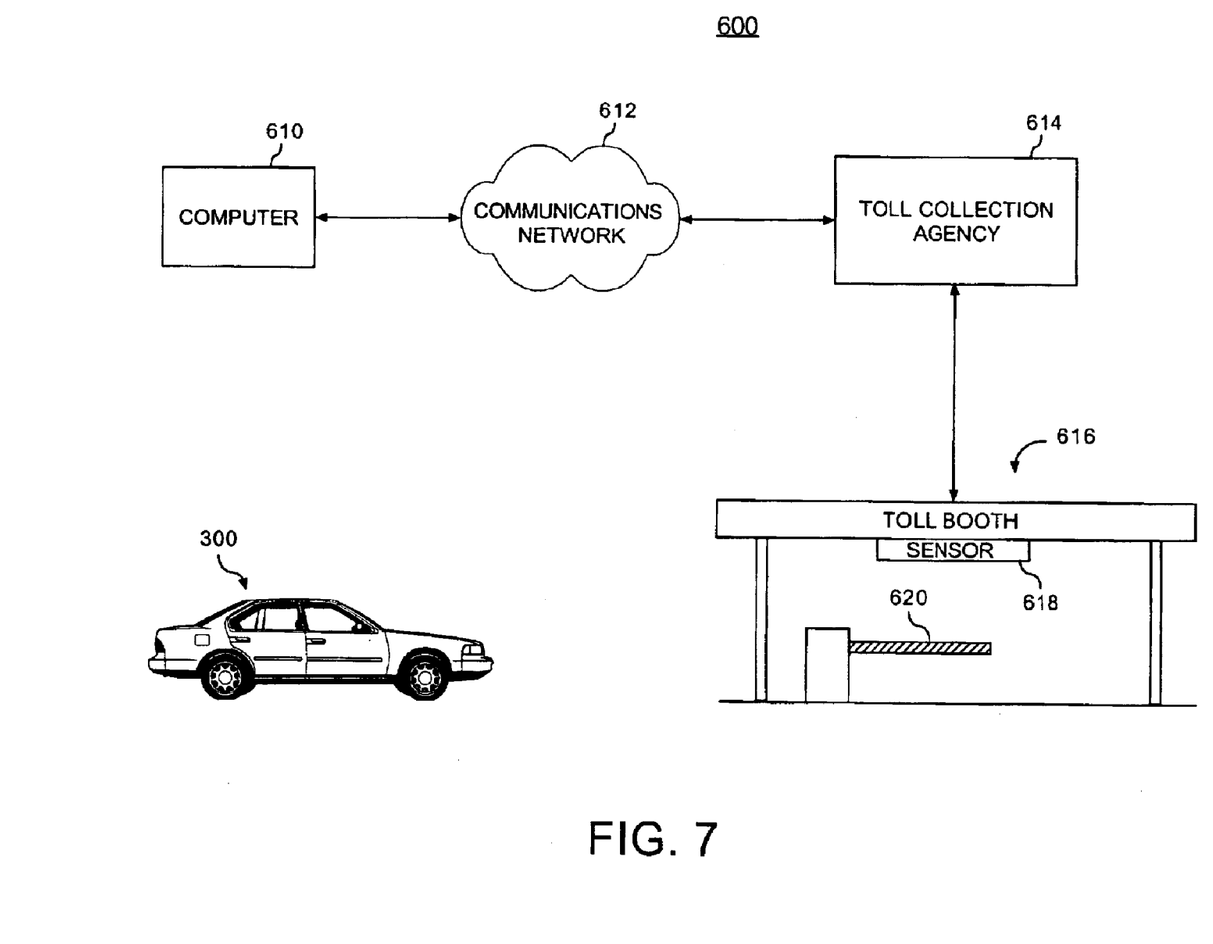
FIG. 7 illustrates a toll collection system in accordance with the inventive arrangements.

Referring to FIG. 7, a toll collection system 600 in accordance with the inventive arrangements is shown. The toll collection system 600 can include a computer 610, a communications network 612 such as the Internet, a toll collection agency 614, at least one toll booth 616 and at least one vehicle 300 as described in relation to FIG. 5. The toll booth 616 can include one or more sensors 618 and one or more gates 620 for selectively permitting the passage of traffic. In this arrangement, the vehicle 300, in combination with the card 100, can be used to automatically pay tolls associated with the passage of, for example, certain highways, bridges or ferries.

Specifically, the card 100 can be programmed with account information associated with the user of the card 100. Referring to FIGS. 1 and 5, the account information can be stored in the memory 116 and can be eventually transferred to the card reader microprocessor 316. The transfer of information to the card 100 has been previously illustrated, and a detailed discussion is not warranted. Referring back to FIG. 7, the user of the card 100 can then make a payment with the toll collection agency 614. As an example, the user can make an electronic payment over the communications network 612 to the toll collection agency 614 using the computer 610. The user of the card 100 is credited with this payment, and the information is forwarded to a database (not shown) at the toll booth 616. The sensor 618 contains suitable software and circuitry for accessing this database.

When the vehicle 300 approaches the toll booth 616, the sensor 618 can transmit an activation signal to the vehicle transceiver 330. The vehicle transceiver 330 can pass the activation signal to the card reader microprocessor 316. Subsequently, the card reader microprocessor 316 can forward to the vehicle transceiver 330 the account information associated with the user of the card 100 who has previously been biometrically identified. The vehicle transceiver 330 can transmit the account information to the sensor 618, which automatically checks the database to determine whether the account is in good standing. If the account has an acceptable credit, the sensor 618 signals the gate 620 to permit the vehicle to pass.

In another embodiment, the card reader microprocessor 316 can instruct the vehicle transceiver 330 to transmit the account information in accordance with a predetermined interval, similar to the process described above with respect to the transmissions to the monitoring station 416 and the portable unit 428. If so, the activation signal transmitted from the sensor 618 may not be necessary for operation of the system 600.

Also, the transceiver 318 on the card 100 can receive the activation signal from the sensor 618 and can transmit the account information associated with the user of the card 100 back to the sensor 618. This feature permits the vehicle 300 to pass through the toll booth 616 even if the vehicle 300 is not equipped with a vehicle transceiver 330.

Although the present invention has been described in conjunction with the embodiments disclosed herein, it should be understood that the foregoing description is intended to illustrate and not limit the scope of the invention as defined by the claims.

What is claimed is:

1. A vehicle identification system, comprising:
    an electronic access card for storing information associated with a user of said electronic access card;
    a card reader for receiving said electronic access card and for reading said associated information; and
    a display for receiving at least a portion of said associated information from said card reader and for displaying said portion of associated information when the user operates a vehicle;
    wherein said display is located on the vehicle and said displayed information includes at least a unique identifier assigned to the user of said electronic access card.

2. The system according to claim 1, wherein said unique identifier is transferrable to other vehicles, whereby said identifier is displayed on any vehicle having said card reader and said display when said card reader reads said associated information.

3. The system according to claim 1, wherein said electronic access card includes a biometric identifier for identifying the user and transmits an authorizing signal to said card reader when the user is biometrically identified;
    wherein said card reader reads said associated information in response to said authorizing signal.

4. The system according to claim 3, wherein said biometric identifier generates digitized images of fingerprints.

5. The system according to claim 1, wherein said electronic access card includes at least one electrical contact to permit the transfer of said associated information to said card reader.

6. The system according to claim 1, wherein said electronic access card includes a transceiver for transmitting said associated information to said card reader.

7. The system according to claim 1, wherein said associated information stored on said electronic access card further includes at least one of a name, an address and a driving history of the user.

8. The system according to claim 1, wherein said card reader includes a tracking device and said tracking device receives navigational data concerning the vehicle.

9. The system according to claim 8, further comprising at least one of a monitoring station and a portable unit and the vehicle further comprises a vehicle transceiver;
    wherein said vehicle transceiver transmits said navigational data to at least one of said monitoring station and said portable unit.

10. The system according to claim 9, wherein said vehicle transceiver transmits at least a portion of said information associated with the user of said electronic access card to at least one of said monitoring station and said portable unit.

11. The system according to claim 10, wherein said vehicle transceiver transmits said navigational data and at least a portion of said associated information to at least one of said monitoring station and said portable unit using at least one communications satellite.

12. The system according to claim 10, wherein said vehicle transceiver transmits said navigational data and at least a portion of said associated information to at least one of said monitoring station and said portable unit using a wireless communications network.

13. The system according to claim 10, wherein said vehicle transceiver transmits said navigational data and at least a portion of said associated information to at least one of said monitoring station and said portable unit in accordance with a predetermined interval.

14. The system according to claim 9, wherein the vehicle further includes an ignition system coupled to said card reader;
    wherein said card reader further includes an enabling circuit for enabling said ignition system.

15. The system according to claim 14, wherein said ignition system starts an engine of the vehicle and locks and unlocks at least one door lock of the vehicle.

16. The system according to claim 15, wherein an enabling signal is transmitted to said vehicle transceiver from said monitoring station and forwarded to said card reader;
    wherein said enabling circuit enables said ignition system and said ignition system starts the engine of the vehicle in response to the receipt of said enabling signal by said card reader.

17. The system according to claim 15, wherein an enabling signal is transmitted to said vehicle transceiver from said monitoring station and forwarded to said card reader;
    wherein said enabling circuit enables said ignition system and said ignition system unlocks at least one of the door locks of the vehicle in response to the receipt of said enabling signal by said card reader.

18. The system according to claim 9, wherein the vehicle further includes an ignition system coupled to said card reader;
    wherein said card reader further includes an enabling circuit for disabling said ignition system;
    wherein a disabling signal is transmitted to said vehicle transceiver from said monitoring station and forwarded to said card reader;
    wherein said enabling circuit disables said ignition system and said ignition system stops an engine of the vehicle in response to the receipt of said disabling signal by said card reader.

19. The system according to claim 9, wherein the portable unit is a law enforcement mobile unit.

20. The system according to claim 1, wherein the vehicle further includes a biometric identifier for identifying the user and transmits an authorizing signal to said card reader when the user is biometrically identified;
    wherein said card reader reads said associated information in response to said authorizing signal.

21. The system according to claim 20, wherein said biometric identifier is positioned in the interior of the vehicle.

22. The system according to claim 20, wherein the vehicle further includes at least one door and said biometric identifier is mounted on said door.

23. The system according to claim 1, further comprising at least one toll booth having at least one sensor and at least one gate for controlling the flow of traffic through said toll booth;

wherein the vehicle includes a vehicle transceiver for transmitting to said sensor at least a portion of said associated information read from said electronic access card;

wherein said portion of associated information includes at least information about the user's account with a toll collection agency.

24. The system according to claim 1, further comprising at least one toll booth having at least one sensor and at least one gate for controlling the flow of traffic through said toll booth;

wherein said electronic access card includes a transceiver for transmitting to said sensor at least a portion of said associated information stored on said electronic access card;

wherein said portion of associated information includes at least information about the user's account with a toll collection agency.

25. The system according to claim 9, wherein the vehicle further includes a panic button;

wherein when said panic button is pressed, said vehicle transceiver transmits a distress signal to at least one of said monitoring station and said portable unit.

26. The system according to claim 25, wherein said distress signal includes at least an emergency message and said navigational data.

27. The system according to claim 1, wherein said display is located on an exterior of the vehicle.

28. The system according to claim 1, wherein said unique identifier is a license plate number.

29. A method for identifying a vehicle, comprising the steps of:

providing an electronic access card and a display unit mountable on a first vehicle;

assigning a unique identifier to a user of the card;

storing at least the unique identifier on the card;

reading the unique identifier; and displaying on the display unit the unique identifier when the user operates the vehicle.

30. The method according to claim 29, further comprising the step of displaying on a display unit of a second vehicle the identifier when the user operates the second vehicle.

31. The method according to claim 29, further comprising the step of biometrically identifying the user of the card; and when the user is biometrically identified, performing said reading and displaying steps.

32. The method according to claim 29, wherein the unique identifier is a license plate number.

* * * * *